United States Patent [19]

Black

[11] 4,060,912

[45] Dec. 6, 1977

[54] ABSORBER-CONTACTOR

[76] Inventor: Frank M. Black, 5112 Clay, Houston, Tex. 77023

[21] Appl. No.: 723,509

[22] Filed: Sept. 15, 1976

[51] Int. Cl.[2] .............................................. F26B 3/00
[52] U.S. Cl. ............................................. 34/9; 34/72; 34/79
[58] Field of Search .......................... 34/9, 72, 77, 79; 159/DIG. 33; 55/10, 191, 236, 248

[56] References Cited

U.S. PATENT DOCUMENTS

| 1,660,248 | 2/1928 | Beattie | 159/DIG. 33 |
| 2,663,089 | 12/1953 | Coats | 34/9 |
| 2,691,830 | 10/1954 | Karnofsky | 34/77 |
| 3,410,339 | 11/1968 | Wiegandt | 159/DIG. 33 |

*Primary Examiner*—John J. Camby
*Attorney, Agent, or Firm*—Robert W. B. Dickerson

[57] ABSTRACT

A device and system for removing contaminants, such as vapors or condensibles, from gas. Such device particularly includes a tortious or spiral path-forming member, wherein such contaminated gas is caused to repeatedly pass through a layer of absorbent fluid.

11 Claims, 3 Drawing Figures

ABSORBER-CONTACTOR

BACKGROUND OF THE INVENTION

In view of the present energy crisis, it has become increasingly desirable, or necessary to make more effective use of energy sources, such as natural gas. One of the problems dealt with is that of removing contaminants present in gas, such as unwanted fluid vapors. Various drying techniques have been utilized, particularly the passing of gas upwardly in a tower, and through drying agents, such as glycol. While such prior art devices have served to remove substantial portions of contaminants, a higher degree of efficiency has been sought. Applicant has achieved such efficiency by causing a greater degree of contact between the gas and absorbing fluid - thus the reference to applicant's device as being a contactor. Such greater degree of contact is effected primarily by causing the gas to course a spiralar path, a substantial portion of which is through the absorbing fluid.

SUMMARY OF THE INVENTION

The focal point of the invention includes a container or cylinder with an inlet for gas and contaminant-absorbing fluid, and one or more exits for the dried gas and contaminant-containing fluid. Centrally of such cylinder is an axially disposed shaft having a fin or fins spirally wrapped around and affixed thereto. Connected to adjacent reaches of the spiral, and to the shaft, are segments of plates, which may be notched. Such plates assure that the gas dips into portions of the absorbent fluid present in the cylinder. The cylinder, and its contents, may form a portion of a system, which system essentially recycles the absorbent fluid.

DESCRIPTION OF THE INVENTION

Figure 2:
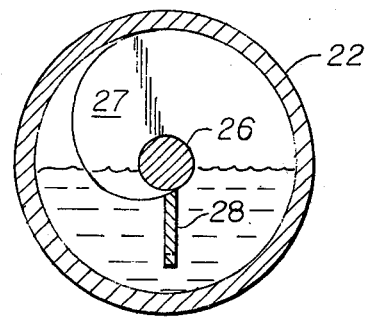
FIG. 2 is a section through the contactor taken along lines 2—2 of FIG. 1.
Figure 1:
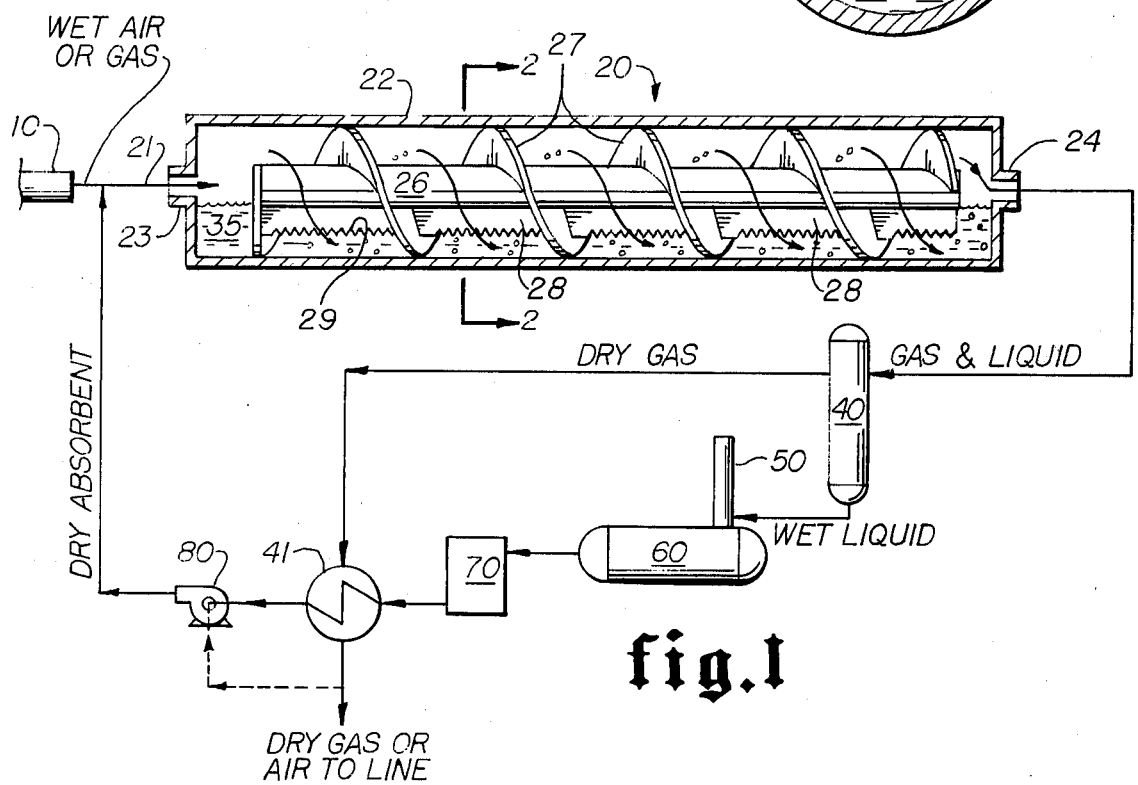
FIG. 1 is a generally schematic illustration of a system, with the contactor portion shown in vertical section.
Figure 3:
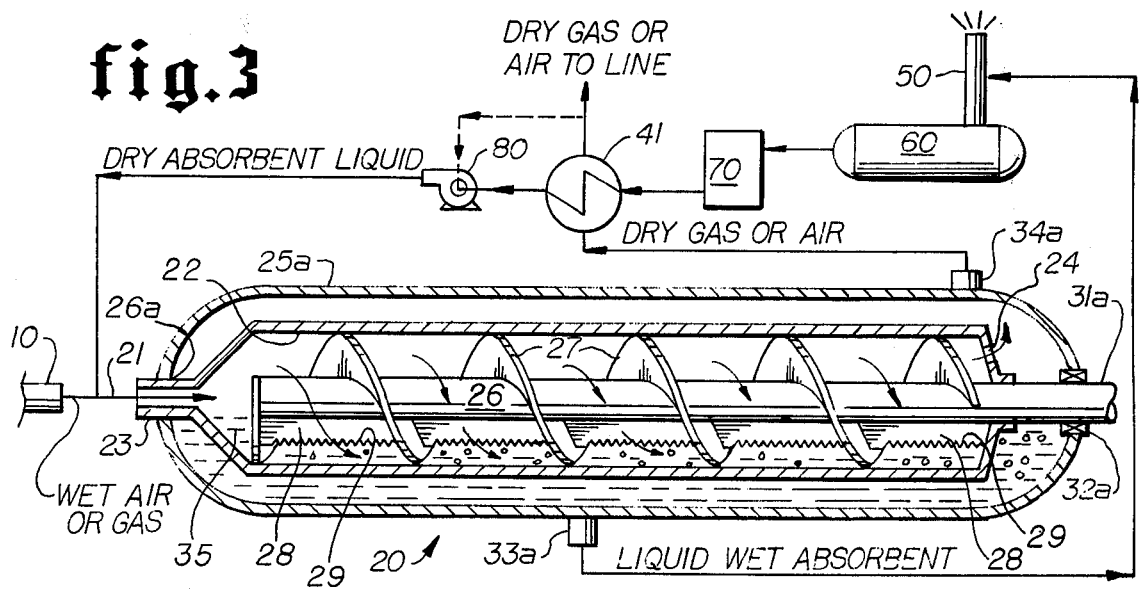
FIG. 3 is a modification of the system of FIG. 1, with the contactor cylinder also serving as a separator.

A source of wet gas, which may be a conduit leading from a production well, is illustrated in both embodiments as 10. Line 21 would link such source 10 to inlet 23 of a contactor, generally shown as 20. Inasmuch as the embodiments of FIGS. 1 and 3 are so similar, like numerals will identify like parts. Differentiating structure in FIG. 3 will have a subscript "a" added to the numeral. Contactor 20 includes a central cylinder 22 which has inlet portions 23 and outlets 24 at opposite ends thereof. In the embodiment of FIG. 3, cylinder 22 is centrally mounted within an outer cylinder or vessel 25a, with inlet 23 fixed to, journaled in, or sealingly engaged with an opening 26a, near one end of the outer cylinder.

Axially positioned with cylinder 22 is shaft 26. Spirally wound around, and fixed to such shaft is member 27, which member may be a continuous plate. The transverse distance between adjacent fin portions of member 27 may be referred to as a "reach". Also connected to and depending from shaft 26, and secured to adjacent fins of member 27, is relatively flat plate 28. Such plate contains a plurality of notches 29, and may be a continuous length extending through cutouts (not shown) in spiral member 27, or may comprise a plurality of segments, each fixed to adjacent fin portions of said spiral member.

In FIG. 3, one end 31a may be journaled for rotation in bushing 32a provided outer cylinder 25a. In such figure, said outer cylinder also includes outlets 33a and 34a whose function will be described hereinafter.

In both embodiments, cylinder 22 may be initially provided with a reservoir 35 of absorbent fluid, such as ethelene glycol, to a level approximating midway of such cylinder. Moisture laden gas, from source 10, and dry absorbent fluid would enter cylinder 22 through inlet 23. Within such cylinder 22, moving from left to right in the drawings, the gas would follow a tortuous path around shaft 26, guided by the fins of member 27, toward exit 24. By virtue of such fin portions substantially blocking passage between their edges and the I.D. of cylinder 22, the gas must be immersed in and pass through the absorbent fluid 25, such intimate contact resulting in substantial decontamination. The presence of plate member 28, insures such immersion. A mixture of dry gas and wet or somewhat saturated absorbent fluid leaves exit 24.

In the embodiment of FIG. 1, such mixture enters a separator 40, of generally known construction. The dry gas, may first pass through heat exchanger 41 to enter a distribution line. After passing through separator 40, the wet fluid enters still 50, heated by reboiler 60, where contaminants such as fluid vapor is expelled, thence as dry fluid to storage tank 70, through heat exchanger then to pump 80. Such pump, which may be of a specialized type, provides the force to drive the absorbent fluid and gas through the system. On exiting pump 80, the now dry absorbent fluid reenters cylinder inlet 23 to restart the cycle.

The substantial modification of FIG. 3 comprises outer cylinder 25a essentially performing as a separator, removing the necessity of a separate separator, such as 40. In this embodiment, on the mixture of "dry" gas and "wet" absorbent fluid leaving exit 24 of cylinder 22, such fluid will gravitate downwardly to leave exit 33a while the dry gas will tend to rise and leave exit 34a. Otherwise, the embodiments are similar. It should be noted, that in contradistinction to most present day systems, the contactor is adapted to be horizontally disposed, rather than being of tower configuration. The space and time conservation is substantial, during all of transportation, installation and use. Such savings are permitted by virtue of applicant's structure causing intimate contact through his spiral arrangement.

Although limited embodiments have been described, it should be obvious that numerous modifications would be possible by one skilled in the art without departing from the spirit of the invention, the scope of which is intended to be limited only by the following claims.

I claim:

1. A device for drying a gaseous media, comprising:
   a cylinder having inlet means for receiving said gaseous media and outlet means for permitting the exiting of said gaseous media and of an absorbent liquid media;
   said cylinder also including means for receiving and accommodating a bath of said absorbent liquid media;
   guide means extending at least partially within said cylinder, said guide means being of such configuration as to cause said gaseous media to follow a tortuous path in traversing from said inlet means to said outlet means, said guide means includes a shaft substantially co-axial with said cylinder and a spiral portion, depending from and extending substantially radially from said shaft, tending to bar passage of said gaseous media other than along said spiral; and separator means series communicating with said outlet means for separating said absorbent liquid media.

2. The device of claim 1 wherein said guide means includes at least one plate portion depending from and extending substantially radially from said shaft in a direction causing said plate portion to be continually immersed in said absorbent fluid media.

3. The device of claim 2 wherein said plate portion includes at least one slotted passageway therethrough.

4. The device of claim 1 and including circuit means for returning said absorbent fluid media from said separator means to said inlet means.

5. A device for drying a first media, comprising:
   a first cylinder having inlet means for receiving said first media and first outlet means for permitting the exiting of said first media;
   said cylinder further including means for accomodating a second media;
   first media guide means extending at least partially within said first cylinder, said guide means being of such configuration as to cause said first media to follow a tortuous path in traversing from said inlet means to said outlet means, said guide means including a shaft substantially co-axial with said first cylinder, and a spiral portion, affixed to said shaft, tending to bar passage of said first media other than along said spiral; and
   a second cylinder, substantially axially receiving said first cylinder, said second cylinder including a first reservoir portion for receiving said second media on it exiting said first outlet means, and also including a second reservoir portion for receiving said first media on it exiting said first outlet means.

6. The device of claim 5 wherein said second cylinder also includes first media outlet means and second media outlet means.

7. The device of claim 6 wherein one end of said shaft is rotatingly received by a portion of said second cylinder.

8. The device of claim 6 including circuit means for transporting said second media from said second cylinder's second media outlet means to said first cylinder's inlet means.

9. The device of claim 8 wherein said circuit means includes reboiler means for separating said second fluid from contaminants, and pump means.

10. A method of drying a wet gas, comprising the steps of:
   a. causing said wet gas to enter a cylinder only partially filled with an absorbent liquid;
   b. causing said wet gas to follow a tortuous cyclical path through said cylinder, part of each cycle of said path being through said absorbent fluid and part of each cycle of said path being without said absorbent fluid;
   c. causing said wet gas and at least a portion of said absorbent liquid to follow concurrent paths and exit said cylinder and to enter a series connected separator.

11. The method of claim 10 wherein a further part of each of said cycles of said wet gas includes its moving in a direction radial of said cylinder within said absorbent fluid.

* * * * *